Figure 1:
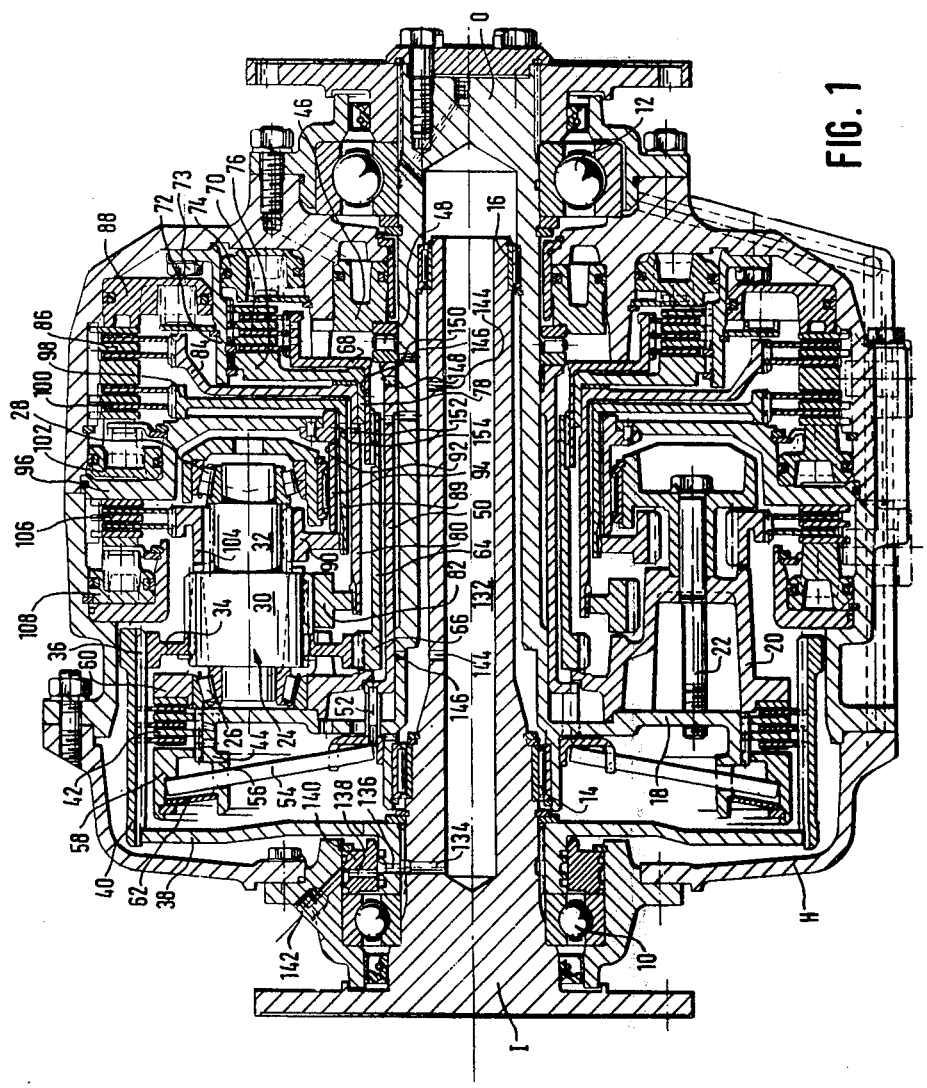

United States Patent [19]

Ahlen et al.

[11] 4,328,716
[45] May 11, 1982

[54] MULTI-SPEED PLANETARY GEAR

[75] Inventors: Karl G. Ahlen; Per-Olof Bergstrom, both of Stockholm, Sweden

[73] Assignee: S.R.M. Hydromekanik Aktiebolag, Sweden

[21] Appl. No.: 843,521

[22] Filed: Oct. 19, 1977

[30] Foreign Application Priority Data

Jul. 26, 1977 [DE] Fed. Rep. of Germany ....... 2733616

[51] Int. Cl.³ .................... F16H 57/10; F16H 3/44; F16D 11/00; F16D 13/60
[52] U.S. Cl. ..................................... 74/760; 74/761; 74/781 R; 74/782; 74/783; 192/107 R; 192/113 A
[58] Field of Search ............. 74/760, 761, 753, 781 R, 74/782, 783; 192/85 CA, 107 R, 113 A

[56] References Cited

U.S. PATENT DOCUMENTS

| | | | |
|---|---|---|---|
| 1,132,958 | 3/1915 | Miller | 192/107 R |
| 1,912,716 | 6/1933 | Lane | 192/113 A |
| 1,936,240 | 11/1933 | Lane | 192/107 R |
| 2,599,559 | 6/1952 | Kelbel | 74/760 |
| 2,968,381 | 1/1961 | Vosler | 192/107 R |
| 3,063,309 | 11/1962 | Grattan | 74/761 X |
| 3,063,530 | 11/1962 | Rosenberger et al. | 192/107 R |
| 3,115,793 | 12/1963 | Hobbs | 74/761 |
| 3,188,885 | 6/1965 | Fisher | 74/761 X |
| 3,412,834 | 11/1968 | Root | 192/85 CA |
| 3,613,848 | 10/1971 | Reiff | 192/85 CA X |
| 3,623,577 | 11/1971 | Scharlack | 192/113 A |
| 3,684,069 | 8/1972 | Pray | 192/85 CA |
| 3,799,003 | 3/1974 | Van Dest | 74/740 |
| 3,857,303 | 12/1974 | Mouttet | 74/761 |
| 4,142,425 | 3/1979 | Ahlen | 74/760 |

FOREIGN PATENT DOCUMENTS

| | | | |
|---|---|---|---|
| 698230 | 11/1964 | Canada | 192/85 CA |
| 2733616 | 2/1979 | Fed. Rep. of Germany | 74/761 |

Primary Examiner—Leslie Braun
Attorney, Agent, or Firm—Larson and Taylor

[57] ABSTRACT

A multi-speed planetary gear transmission having a primary shaft connected to a secondary shaft via a planetary gear having a drive annular gear connected to one of said shafts, a planet carrier connected to the other shaft, and planet gears on the carrier, each having a plurality of gearings of different diameters, and the remaining annular gears other than the drive annular gear engaging the planet gearing to provide different gear steps. All annular gears have couplings with servomotors fixed to the casing. The annular gears are made adjustable on their respective planet gearings by floating, as a result of their being supported in the casing at a support point spaced axially from its gear teeth and located in axial proximity to its coupling. An air flow path is provided across the friction disc couplings when disengaged, as a result of alternating plates being sinusoidal. The direct drive coupling includes a slidable connecting sleeve. Oil is fed from the central shaft to lubricate the planet gear teeth and bearings. The servomotor pistons have seals which permit their tilting within their respective cylinders. The engaging gears may be constructed in different ways to adapt to sagging of the planet gears.

26 Claims, 4 Drawing Figures

MULTI-SPEED PLANETARY GEAR

This invention relates to a multistage planetary gear for motor vehicles, comprising a single planet wheel carrier rotatable mounted in a housing, the planet wheels of which have at least two sets of teeth of different diameters which mesh with at least three internally toothed or externally toothed central wheels, one of which central wheels forms the transmission input member while the transmission output member is formed by the planet wheel carrier, and in which the other central wheels are adapted to be fixed selectively against rotation of the transmission housing by means of friction disc brakes which are operated by servo motors fixed to the housing according to co-pending Patent Application Ser. No. 714,287.

In the said co-pending application, the object of producing such a transmission was to provide a planet wheel gear for motor vehicles which could be switched under load and which, while having the smallest possible dimensions and being very inexpensive to manufacture would dispense with the need for servo motors rotating with it, and could be rapidly and reliably switched with the least possible amount of hydraulic fluid.

One special advantage of the transmission according to co-pending Patent Application Ser. No. 714,287 is that by using the planet wheel carrier as driven member in all transmission stages or gears, the sum of the relative velocities of the gear wheels and of the brake or clutch discs is relatively small. This results in a considerable reduction in the losses, compared with those of known multistage planet gears.

It is an object of the present invention to achieve an even further reduction in these losses and hence to provide a multistage planet gear which can be switched under load and which is superior to the most commonly used synchromesh gears both in its ease of manufacture and in its losses.

To solve this problem according to the present invention, all the central wheels can be freely adjusted during their rotation to the planet wheel teeth with which they mesh. The brakes of the externally toothed central wheels are arranged at a considerable axial distance from the teeth of these wheels, and the externally toothed central wheels themselves are radially supported on the transmission housing in close axial proximity to their brakes.

As a result of these measures, the losses at the points of action of the teeth are considerably reduced due to the elimination of radial forces between the toothings. This contributes to a considerable reduction in the overall losses.

In a planet wheel gear of the type described above, which, according to a further development of the invention of co-pending Patent Application Ser. No. 714,287 is provided with a friction disc clutch arranged between the driving central wheel and the planet wheel carrier in order to establish a direct drive, which friction disc clutch is moved into engagement by a servo motor fixed in the housing, by way of an axially displaceable compression member, a further reduction in the losses is achieved by making the compression member in the form of a clutch sleeve which rotates with the planet wheel carrier and which establishes the connection between the clutch and the servo motor with interposition of a single axial pressure bearing.

According to another feature for the further development of the invention, the friction discs of the brakes and of the clutch are arranged to be non-rotatable but axially displaceable on or in their supports by means of multigroove connections. Due to this arrangement, the friction discs can freely adjust themselves when the brake or clutch is disengaged so that it is unnecessary to introduce large quantities of lubricating oil and instead of considerable losses due to hydraulic friction, there are now only negligible air suspension losses. This air suspension is further promoted by the fact that the discs of one half of the brake or clutch are made of steel and their surface, seen in the circumferential direction, has a sinusoidal undulation of small amplitude while the friction discs of the other half of the brake or clutch are plane. The latter friction discs may advantageously be equipped with sintered metal linings.

The desired air suspension lubrication may be further improved if the internal friction disc holder of the brakes and of the clutch, which holder rotates in the state of disengagement, is provided with radial air channels for carrying a stream of air between the friction discs and if the friction discs which are connected with the external holders have perforations for returning the stream of air, which perforations are situated outside the range of action of these holders. This measure ensures that at high velocities, a stream of air develops between the friction discs and both separates and lubricates the discs.

In order that metal contact between the friction discs in the brakes and the clutch will also be avoided at low relative velocities, small quantities of oil in the form of a mist may be introduced between these friction discs with the same stream of air. This is advantageously achieved by making the central shaft which passes through the planet gear a hollow shaft and connecting it to a source of pressure oil and by providing the central shaft, as well as the hubs of the externally toothed central wheels surrounding it, with radial distributing apertures for supplying the bearings and the tooth systems of the planet wheels and of the brakes and the clutch with a mist of lubricating oil.

In order to achieve an even further reduction in the losses at the points of action of the teeth, a special constructional feature of the invention provides that those gearings of the planet wheels which have the largest diameter are cambered and the central wheels which mesh with the small gears of the planet wheels are also cambered. In addition, those central wheels which mesh with the planet wheel gears of smallest diameter may advantageously be constructed conically to adapt them to sagging of the planet wheels and/or of the planet wheel carrier or they may have a suitable radial wall thickness to allow for sagging.

Owing to the reduction in losses achieved by the measures outlined above, a multistage planet gear of the type defined above can be made much smaller for a given performance, and this further reduces the losses. In addition, due to the air cushioning and the fact that the central wheels, including the central wheel which forms the driving element, are freely adjustable, the transmission according to the invention may be used for much higher speeds of rotation than has hitherto been possible, and this even further reduces the percentage losses.

Figure 2:
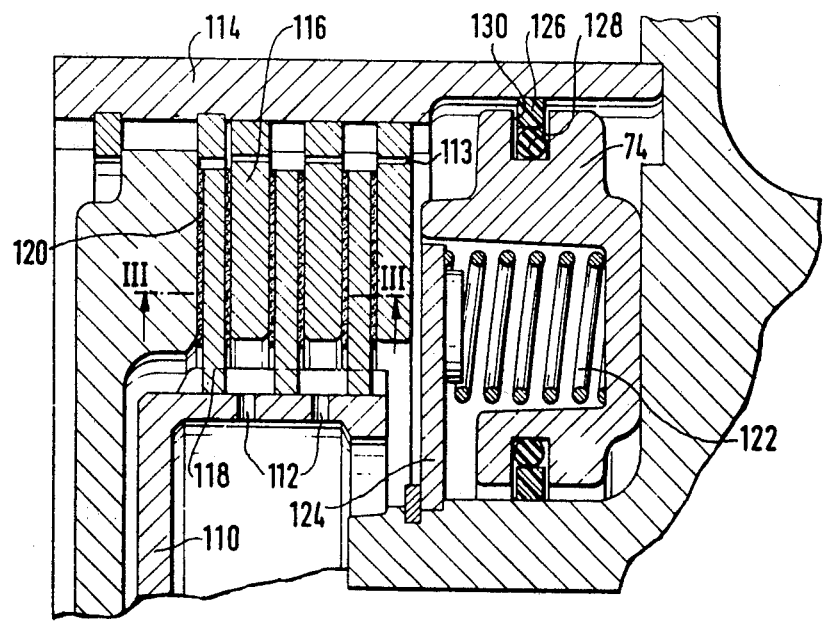
Figure 3:
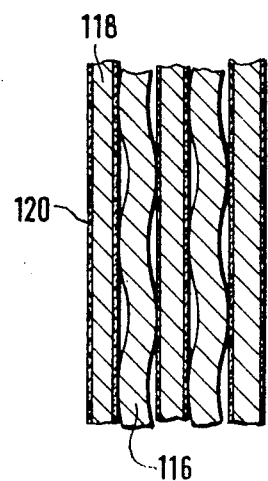
Figure 4:
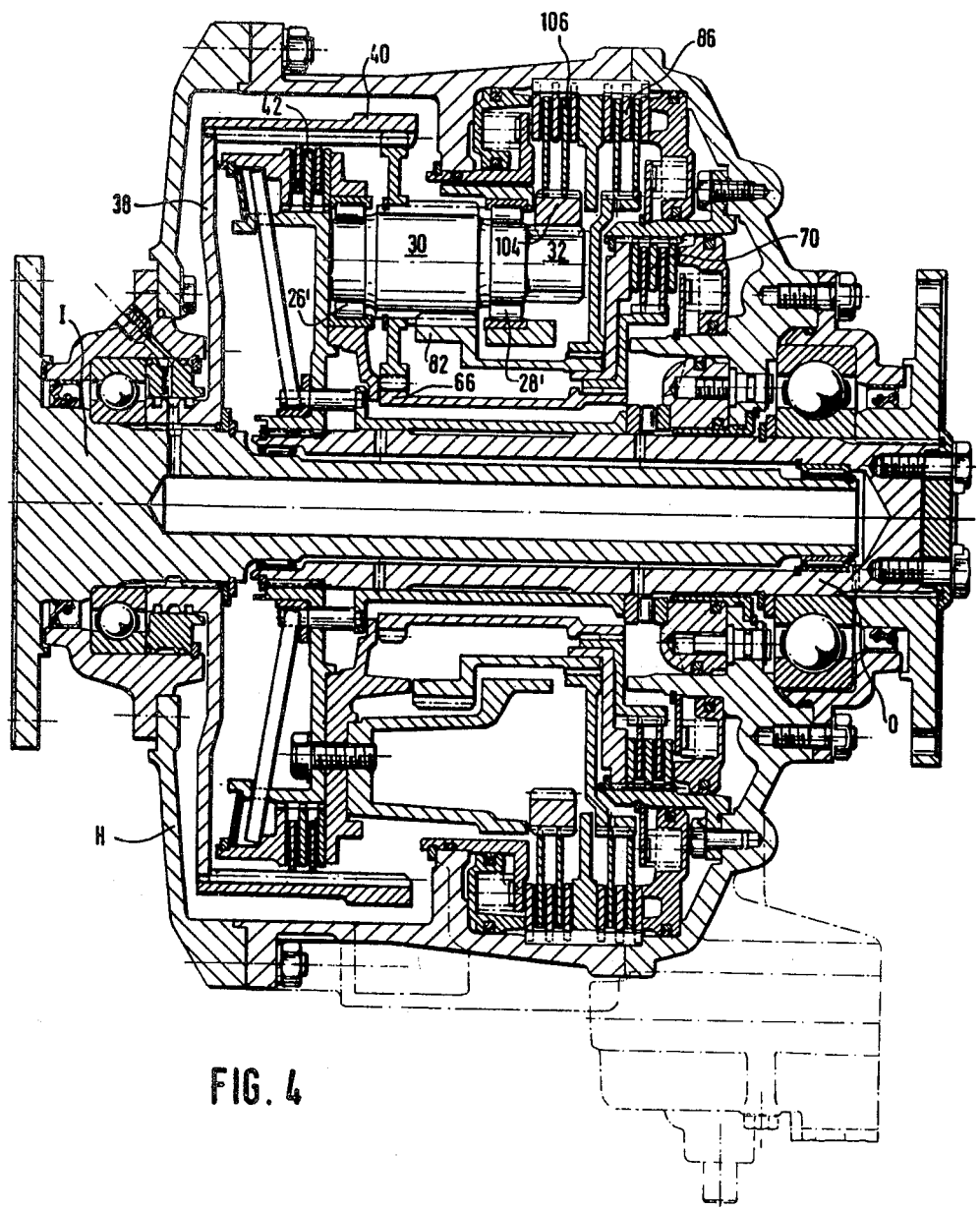

Other features advantageously developing the invention will be seen from the description of two preferred embodiments of the invention given below with reference to the accompanying drawings, in which FIG. 1 is an axial section through a first multistage planet gear according to the invention with planet wheels having three gearings of differing diameters, which planet wheels are mounted in the planet wheel carrier at their outer ends, FIG. 2 shows a detail from FIG. 1 on an enlarged scale, FIG. 3 is a longitudinal section coaxial with the axis of the transmission, taken on the line III—III of FIG. 2, and FIG. 4 is an axial section through a modified form of a multistage planet gear according to the invention, in which the planet wheels are mounted between the smallest and the middle gearing.

The planet gear shown in FIG. 1 is a multispeed gear which can be switched under load, with three stepped down forward gears, one direct transmission and one stepped down reverse gear. The transmission has an output shaft I and an output shaft 0 mounted in ball bearings 10 and 12, respectively, inside a non-rotatable gear casing H. In addition, the output shaft 0, which is for the most part hollow, contains the input shaft I in two roller or needle bearings 14,16.

The output shaft 0 carries a flange 18 near its front end. A planet wheel carrier 20 is fixed to this flange 18 by several screws 22 distributed over its circumference. A number of planet wheels 24, preferably three, are mounted at their ends on the planet wheel carrier 20 between the screws 22 by means of cone bearings 26,28.

Each planet wheel 24 has a gearing 30 of larger diameter and a gearing 32 of smaller diameter. A gear wheel 34 is slipped over the front end of the larger gearing 30 to which it is non-rotatably fixed by means of a splined bore, and this gear wheel 34 has gear teeth 36 on its external circumference. Counting the gear wheel 34, each plant wheel 24 thus has a gearing 36 of large diameter, a gearing 30 of medium diameter and a gearing 32 of smaller diameter, arranged in that order from the front to the back.

A disc 38 is non-rotatably attached to the input shaft I in front of the planet wheel carrier 20. This disc 38 has a circumferential gearing which meshes with the internal gearing which extends along the whole length of a first central wheel 40 which is in the form of a sleeve. The rear end of this central wheel 40 meshes with the largest gearing 36 of the planet wheels 24. In addition, the central wheel 40 serves as one of the disc holders of a multidisc friction clutch 42 whose other disc holder is formed by an externally geared collar 44 attached to the flange 18 of the output shaft 0. The friction discs of this clutch are alternately engaged non-rotatably with the central wheel 40 or the attachment 24 by means of multigroove connections but remain axially displaceable.

A servo motor piston 46 seated in an annular cylinder formed in the casing H is provided for engaging the friction clutch 42. This servo motor piston 46 cooperates with a clutch sleeve 50 by way of an axial thrust bearing 48, said clutch sleeve being displaceably and rotatably mounted on the output shaft 0. Tappets 52 attached to the other end of the clutch sleeve 50 and supported in axial bores in the flange 18 of the output shaft 0 ensure that the clutch sleeve 50 is non-rotatably connected to the output shaft 0 and the planet wheel carrier 20. The front ends of the tappets 52 touch the inner ends of a number of radial clutch levers 54 distributed around the axis of the transmission. Beyond the middle of their length, these radial levers pass through radial apertures 56 formed in a stepped extension of the collar-like attachment 44 of the flange 18, and at their outer ends they contact a thrust ring 58 which is adapted to press the friction discs of the clutch 42 against an abutment 60 on the planet wheel carrier 20, thereby holding the discs together by friction. The movement of the thrust ring 58 produced by the servo motor piston 46 is counteracted by a cup spring 62 so that the clutch levers 54 are constantly held under tension between the tappets 52 and thrust ring 58 on the one hand and the edge of the radial apertures 56 on the other. It will be obvious that the eccentric support of the clutch levers 54 in the radial apertures 56 assists the force exerted by the servo motor piston 46 directed towards engaging the clutch 42.

The clutch sleeve 50 is surrounded with some radial clearance by a hollow shaft 64 on the front end of which an externally toothed central wheel 66 is non-rotatably mounted. This wheel 66 meshes with the largest gearing 36 of the planet wheels 24. The rear end of the hollow shaft 64 is non-rotatably attached to a friction disc 68 by means of a multigroove connection. The external rim of this disc 68 is in the form of a collar which serves as one of the disc holders of a multidisc friction brake 70. The other disc holder of this brake is formed by an internally geared flange sleeve 72 which is fixed to the rear wall of the gear casing H by screws 73 and forms the external boundary of an annular cylinder formed in the casing for a servo motor piston 74 which actuates the brake 70. The abutment for this brake is formed by a back pressure plate 76 which fits into the flange sleeve 72 and carries an extension 78 in the form of a collar inside which is mounted the hub-like extension of the friction disc 68, which extension establishes the multigroove connection to the hollow shaft 64. In this way, the hollow shaft 64 is mounted in the casing H in axial proximity to its associated brake 70, and by virtue of its axial distance from the gearing on the associated central wheel 6, it enables this gearing to be freely adjustable in relation to the planet wheel gearing 36.

A hollow shaft 80 is mounted in a similar manner on the outside of the collar-like extension 78 of the counterpressure plate 76. This hollow shaft 80 carries at its front end another central wheel 82 which meshes with the medium gearings 30 of the planet wheels 24. A flange 84 at the rear end of the hollow shaft 80 forms one of the disc-holders of a multidisc friction brake 86 which is designed to be operated by a servo motor piston 88 which is displaceably mounted in the casing H.

A third hollow shaft 89 carries at its front end a fourth central wheel 90 which meshes with the smallest gearings 32 of the planet wheels 24. The rear end of this shaft 89 is mounted in a sleeve 94 with interposition of a ring bearing 92. This sleeve 94 extends forwards as far as the central wheel 90 and is attached to a partition 96 which forms part of the gear casing. A flange 98 at the rear end of the hollow shaft 89 serves as one of the disc holders of a multidisc friction brake 100 which is operated by a servo motor piston 102 displaceably mounted in the casing H.

Lastly, the smallest gearings 32 of the planet wheels 24 mesh externally with an internally geared central wheel 104 which is in the form of a sleeve on which one half of the friction discs of a multidisc friction brake 106 are mounted to be non-rotatable but axially displaceable thereon. This brake 106 is designed to be operated by a servo motor piston 108 which is axially displaceable in the casing H.

All the friction discs of the friction brakes 70, 86 100 and 106 are mounted to be non-rotatable but axially displaceable on their holders by means of multigroove connections in the same way as the friction discs of the friction clutch 42 so that when they are disengaged they can adjust their position freely and without making contact. This contact-free adjustment is further assisted in the clutch and all the brakes by providing radial channels in the internal friction disc holder. This is shown particularly in FIGS. 2 and 3 representing sectional views on an enlarged scale of the friction brake 70, where the internal friction disc holder 110, which rotates when the brake is released, has radial channels 112 through which a stream of air is sent between the friction discs due to the rotation of the holder, and this air stream is then removed through apertures 113 distributed over the circumference in the friction discs 116 mounted on the external disc holder 114, outside the range of action of these discs, to be returned. An air suspension is thereby formed between the friction discs when the brake is released, and the losses of these discs is extremely low.

The external friction discs 116 are made of steel and, as shown in FIG. 3, they have slight sinusoidal undulations in the circumferential direction, about 0.2 mm in amplitude, which further assist the air suspension mentioned abov e. The internal friction discs 118 which are non-rotatably mounted on the internal holder 110 are plane and have sintered metal linings on both sides. The discs are preferably so arranged that each undulating external disc 116 is enclosed by two internal discs 118. In some cases, the brake or clutch could have only one sinusoidal steel friction disc enclosed by two plane friction discs which are lined with sintered metal linings. Moreover, the positions of the two types of discs on the two holders could be reversed.

The friction brake 70 illustrated by way of example in FIG. 2 also shows that the annular servo motor pistons of the friction brakes, in this case the servo motor piston 74, are urged in the direction of disengagement by several helical compression springs 122 which are distributed over the circumference and bear against abutments 124 fixed to the casing. The size of the springs 122 is calculated to ensure rapid and complete return of the pistons to their position of disengagement after the pressure on them has been released. FIG. 2 also shows that the servo motor pistons are mounted with a relatively large clearance in the cylinders and sealed off against them by a double piston ring arrangement consisting of an external piston ring 126 which is rectangular in cross-section and made of a low friction material such as tetrafluoroethylene (Teflon) and an internal O ring 128 which is seated inside a piston ring groove 130 and urges the external piston ring 128 against the cylinder wall. This arrangement not only provides an optimum sealing effect but also allows the servo motor piston to tilt without risk of jamming in its cylinder.

As shown in FIG. 1, the input shaft I which is the most internally situated shaft, has an axial bore 132 which communicates through a radial channel 134 and other radial channels 136,138 formed in the hub of the disc 38 and in a sleeve 140, respectively, with an oil inlet bore 142 in the casing H, by which pressure oil, for example from the pressure oil pump for the servo motor pistons, can be supplied to the axial bore 132. The input shaft I, output shaft O, clutch sleeve 50 and hollow shafts 64,80 and 88 also have radial bores 144,146,148, 150, 152 and 154 through which the pressure oil in the axial bore 132 is supplied to the bearing of the clutch sleeve 50 and of the hollow shafts 64,80, 89 and in addition is supplied in the form of an oil mist to the teeth and bearings of the planet wheels and of the friction clutch and to the friction brakes so that these will be sufficiently lubricated, especially at low differential speeds, at which the above mentioned air cushioning is not effective.

As already mentioned above, the number of planet wheels is preferably 3 because this ensures perfect centering of the central wheels in relation to the gearings of the planet wheels. In addition, the provision of only three planet wheels allows for a certain elastic deformation of the central wheels for perfect intermeshing of the gear teeth. Intermeshing of the teeth should be further assisted by cambering one of the intermeshing gearings. In the case of the large gearing 36 of the planet wheels, this cambering is suitably provided on the teeth of the gear wheel 34, and in the other gearings 30,32 of the planet wheels, it is preferably provided on the teeth of the central wheels 66,82,90 and 104 which are in engagement with them.

The multidisc friction brakes 70, 86 and 100 which fix the externally geared central wheels 66, 82 and 90 against the transmission casing H to prevent their rotation, serve to switch on three forward reduction gears, the friction clutch 42 which is engaged by means of the servo motor piston 45 is used for direct transmission, and the friction brake 106 which is engaged by means of the servo motor piston 108 and thereby inactivates the internally geared central wheel 104 is used for switching into reduced reversing gear. By choosing suitable diameters for the gearings 36,30 and 32 of the planet wheels 24 in proportion to the axial distance of the planet wheels from the central transmission axis it is possible, for example, to obtain the following speed ratios between the input shaft I and output shaft O:

Friction brake 100: 2.519:1 (forward)
Friction brake 86: 1.866:1 (forward)
Friction brake 70: 1.343:1 (forward)
Friction clutch 42: 1:1 (direction transmission)
Friction brake 106: 1.2:1 (reverse).

It can be seen that the steps between the individual forward gears are almost identical and the reverse gear has the transmission ratio normally found in motor vehicles. All this is achieved with a planet wheel gear having only one planet wheel carrier whose planet wheels have three gearings of differing diameters and due to the special construction of this transmission and its stationary brakes, the friction and ventilation losses are kept extremely low.

The multistage planet gear of FIG. 4 is similar in lay-out and in its individual constructional features to the transmission shown in FIG. 1, with only two differences: First, the externally geared central wheel 90 of FIG. 1, which meshes with the smallest gearing 32 of the planet wheels, is absent from the planet gear of FIG. 4; second, the planet wheels 24 are mounted in roller bearings 26', 28', of which the rear roller bearing 28 is situated between the gearing 30 and the gearing 32 of each planet wheel 24. This arrangement has the advantageous effect of reducing sagging of the planet wheels.

What we claim is:
1. A multi-speed planetary gear transmission comprisisng a casing, primary and secondary shafts, each journalled in the casing, a planet carrier drivingly connected to one of said shafts with at least one planet gear mounted therein, each planet gear having at least two gearings of different diameters, at least three annular gears, one of said annular gears being a drive annular gear drivingly engaged with the shaft other than the one to which the planet carrier is drivingly engaged, each of the remaining annular gears engaging one of the said planet gearings, a direct drive coupling for directly drivingly connecting the drive annular gear and the planet carrier, a coupling associated with each of the said remaining annular gear for connecting it against rotation relative to the casing, servo-motor means for connecting each of the said couplings, and at least one of said couplings being a friction disc coupling having a first set of disc or discs and a second set of disc or discs, the discs of both sets being mounted on spline connections to be movable axially into and out of engagement with each other to respectively engage and disengage the coupling, connecting means connecting the said at least one coupling to its respective annular gear, said connecting means including an essentially cylindrical collar located at a distance radially outwardly from said shafts, said collar including axially extending splines, the disc or discs of the first set being mounted on said splines for free axial movement and fixed against rotational movement relative to said collar, and the disc or discs of the second set being mounted by spline means at it or their radial outer sides to a reference member for free axial movement and fixed against rotational movement relative to said reference member, said collar including small radial air flow channels therein for carrying high velocity streams of air between adjacent discs, and including apertures located radially outwardly of the area of engagement of the discs to permit outflow of said air streams from the coupling, the disc or discs of one of said sets being plane and the disc or discs of the other set having its or their surfaces formed as sinusoidal undulations, taken in the circumferential direction, the amplitude of the undulations in the disengaged position being great enough to permit said air flow entering said air channels to flow into the radially extending spaces between successive undulations, and said amplitude being low enough to allow air to enter in a circumferential direction into the locations between the highest points of each undulation and the plane surface which it faces upon relative rotation of the first and second sets of disc or discs in the disengaged condition of the coupling, whereby such air, passing between the high points of the undulations and the facing plane surfaces acts as an air bearing therebetween.

2. A multi-speed planetary gear transmission according to claim 1, said at least one friction disc coupling being one of the couplings associated with one of the remaining annular gears.

3. A multi-speed planetary gear transmission according to claim 2, wherein the couplings associated with all of said remaining annular gears are said at least one friction disc couplings.

4. A multi-speed planetary gear transmission according to claim 3, wherein all of said couplings are said at least one friction disc couplings.

5. A multi-speed planetary gear transmission according to claim 1, the said amplitude being approximately 0.2 mm.

6. A multi-speed planetary gear transmission according to either claim 1 or claim 5, said second set of discs being fixed against rotation relative to a stationary part of the casing.

7. A multi-speed planetary gear transmission according to claim 6, the said servo-motors for the remaining annular gears being fixed against rotation relative to a stationary part of the casing.

8. A multi-speed planetary gear transmission according to claim 1, wherein the undulating disc or discs are made of steel and the plane disc or discs are formed with sintered metal facings.

9. A multi-speed planetary gear transmission comprising a casing, a primary shaft and a secondary shaft, each of said shafts being journalled with respect to the casing, a planet carrier drivingly connected to one of said shafts at least one planet gear rotatively mounted on said planet carrier, each said planet gear consisting of at least two planet gearings of different diameters, at least three annular gears, one of said annular gears being a drive annular gear engaged with the shaft other than the one to which the planet carrier is drivingly connected, each of the remaining annular gears engaging one of the said planet gearings, such that each planet gearing has at least one annular gear engaged therewith, coupling means associated with each of the said remaining annular gears for connecting it against rotation relative to the casing, and including servo-motor means for connecting each of the said coupling means, each of said servo-motor means being mounted in the casing against rotation relative to the casing, at least one of the remaining annular gears being radially supported by the casing at a support point which is stationary with respect to the casing, and which is spaced substantially in the axial direction from the gear teeth of that annular gear, and said support point being in axial proximity to its respective said coupling, whereby the annular gear is adjustable with respect to the planet gearing which it engages.

10. A multi-speed planetary gear transmission according to claim 9, at least one of said couplings being a friction disc coupling with one set of discs fixed against rotation relative to the casing and a second set comprising a single disc or a plurality of discs, interposed between the discs of the first set, being constrained against rotation relative to its respective annular gear, the disc or discs of both sets being movable axially against each other for engagement of the coupling and axially away from each other for release of the coupling, and means for providing an air flow path into and through the location of the discs, including between the adjacent discs, when the coupling is disengaged.

11. A multi-speed planetary gear transmission according to claim 9, wherein the drive annular gear is a ring gear, and said at least one annular gear is a sun gear, a tubular sleeve connected to the sun gear and coaxial therewith and extending axially away therefrom, a flange connected to the end of the sleeve remote from the sun gear and extending radially generally outwardly therefrom to its respective coupling, and said support point being at the area of the location where the sleeve and flange meet.

12. A multi-speed planetary gear transmission according to claim 11, including at least two of said sun gears, and wherein the sleeves of the two sun gears extend from their respective planet gearings in the same direction and are coaxial with the inner sleeve extending farther in the axial direction than the outer sleeve to its support point.

13. A multi-speed planetary gear transmission according to claim 12, said at least one planet gear having three different gearing diameters, each having a said annular sun gear engaged therewith, wherein the two inner sleeves engage opposite sides of a common fixed support point on the housing, and the outermost sleeve engages another fixed support point on the housing.

14. A multi-speed planetary gear transmission according to claim 9, wherein said couplings are friction disc couplings, and said at least one remaining gear is a sun gear having a sleeve connected at one end to the teeth of that annular gear and connected at its other end to a radially extending flange, the support point being at the junction of the sleeve and flange, and the outer periphery of the flange supporting a friction disc or a plurality of discs of the coupling, said disc or discs being located between other discs fixed against rotation relative to the casing.

15. A multi-speed planetary gear transmission according to claim 9, said drive annular gear being a ring gear connected to the primary shaft and at least two of the remaining annular gears are sun gears radially supported in the casing at respective said support points.

16. A multi-speed planetary gear transmission according to claim 15, including a further remaining annular gear on the same side of the planet gears as the drive ring gear to provide a reverse gear.

17. A multi-speed planetary gear transmission according to claim 9, said drive annular gear being a ring gear, a friction disc coupling for a direct drive connection between the drive ring gear and the planet carrier, a servo-motor stationarily mounted in the casing for operating the direct drive coupling, and a sleeve coaxial with the annular gears and receiving the force of the direct drive servo-motor at one end, and at its other end, acting as a lever to effect engagement of the direct drive coupling.

18. A multi-speed planetary gear transmission according to claim 9, said transmission including a hollow centrally located shaft, some of said remaining annular gears being sun gears, each sun gear having a tubular sleeve connected at one end to its gear teeth, its other end connected to its respective coupling, and including means for introducing lubricating oil into the hollow shaft, and apertures in the shaft and said sleeves for delivering said lubricating oil to the area of the planet gears to lubricate the bearings which mount the planet gears on the planet carrier, and the gear teeth of the planet gears.

19. A multi-speed planetary gear transmission according to claim 9, wherein the clearance of the servo-motor pistons within their respective cylinders is sufficiently great to permit slight tilting of the servo-motor pistons relative to the axes of their respective cylinders.

20. A multi-speed planetary gear transmission according to claim 19, wherein said servo-motors are sealed in their respective cylinders by sealing rings made of a low friction non-metallic material, and wherein the said sealing rings are imbedded in grooves on the periphery of their respective servo-motor pistons and biased radially outwardly by O-rings situated between the said sealing rings and the bottom of the grooves within the said servo-motor pistons.

21. A multi-speed planetary gear transmission according to claim 9, wherein the gearings of the planet gears having the greatest diameter are cambered and the annular gears which mesh with the smaller diameter gearings are also cambered.

22. A multi-speed planetary gear transmission according to claim 9, wherein the annular gears which mesh with the smallest diameter planet gearings are constructed to adapt to sagging of the planet gears and the planet carrier.

23. A friction disc coupling for engaging two rotary members together or for releasing them for relative rotation therebetween, comprising: a first set of disc or discs and a second set of disc or discs, the discs of both sets being mounted on spline connections to be movable axially into and out of engagement with each other to respectively engage and disengage the coupling, an essentially cylindrical collar located at a distance radially outwardly from the axis of said rotary member, said collar including axially extending splines, the disc or discs of the first set being mounted on said splines for free axial movement and fixed against rotational movement relative to said collar, and the disc or discs of the second set being mounted by spline means at its or their radial outer sides to a reference member for free axial movement and fixed against rotational movement relative to said reference member, said collar including small radial air flow channels therein for carrying high velocity streams of air between adjacent discs, and including a plurality of small air flow apertures located radially outwardly of the area of engagement of the discs to permit outflow of said air streams from the coupling, the disc or discs of one of said sets being plane and the disc or discs of the other set having its or their surfaces formed with sinusoidal undulations, taken in the circumferential direction, the amplitude of the undulations in the disengaged position of the coupling being great enough to permit said air flow entering said air channels to flow into the radially extending spaces between successive undulations, and said amplitude being low enough to allow air to enter in a circumferential direction into the locations between the high points of each undulation and the plane surface which it faces, upon relative rotation of the first and second sets of discs in the disengaged condition of the coupling, whereby such air, passing between the high points of the undulations and their facing plane surfaces, acts as an air bearing therebetween.

24. A friction disc coupling according to claim 23, wherein said amplitude is approximately 0.2 mm.

25. A friction disc coupling according to either claim 23 or claim 24, wherein the undulating disc or discs are made of steel and the plane disc or discs have sintered metal facings.

26. A friction disc coupling according to claim 23, wherein the first set of discs comprise a single disc having undulating surfaces, and the second set of discs comprise at least two discs having plane surfaces, one on each side of the single disc of the first set.

* * * * *